Figure 1:
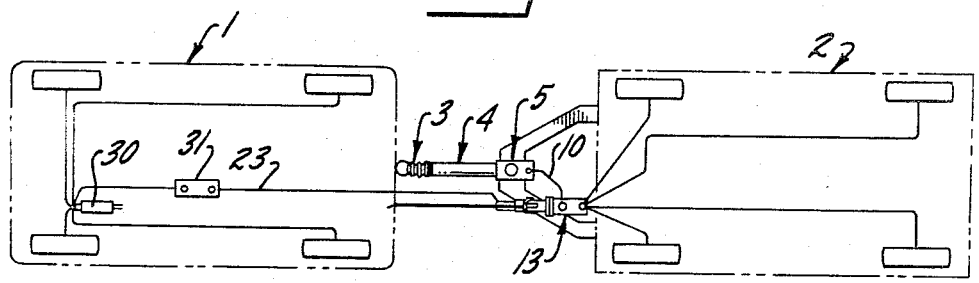

Aug. 8, 1967     H. E. BRANSON     3,334,712
HYDRAULIC CONTROL

Filed July 12, 1965     2 Sheets-Sheet 1

INVENTOR
Henry E. Branson,
BY Parker & Carter
Attorneys.

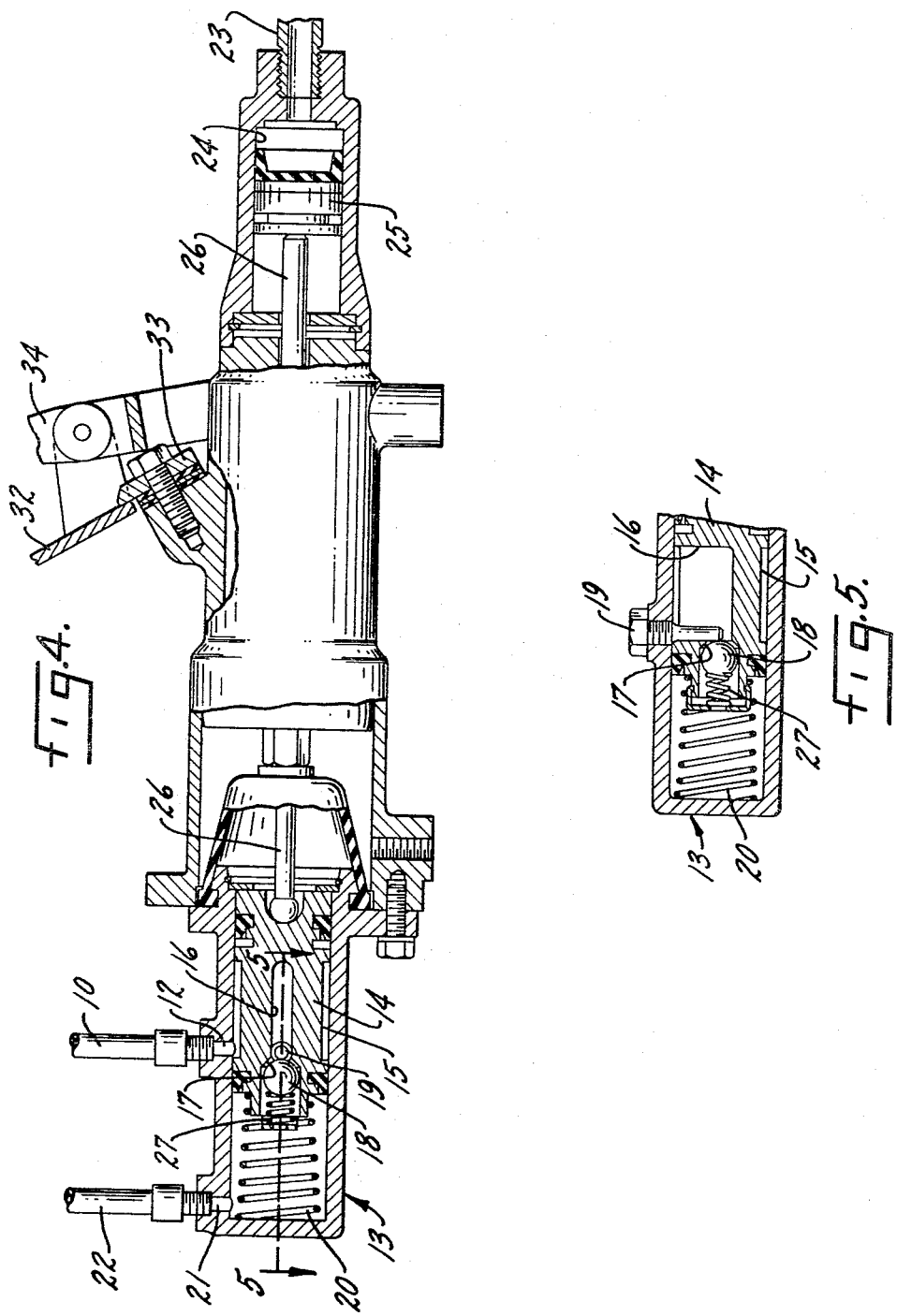

United States Patent Office 3,334,712
Patented Aug. 8, 1967

3,334,712
HYDRAULIC CONTROL
Henry E. Branson, Chicago, Ill., assignor to Stromberg Hydraulic Brake and Coupling Company, Chicago, Ill., a corporation of Illinois
Filed July 12, 1965, Ser. No. 471,075
2 Claims. (Cl. 188—112)

This invention relates to improvements in hydraulic controls especially applicable to the control of the brakes of a tractor trailer combination and has for one object to provide, automatic surge brake means for applying the brakes on the trailer responsive to reduction in the speed of the tractor and means directly responsive to the will of the driver of the tractor for applying the brakes on the trailer independent of the surge operation.

A surge brake apparatus associated with the tractor is entirely independent of the brake system of the tractor. The braking effect takes place exclusively as a result of the inertia of the trailer as it catches up with the tractor and the brakes are applied as a result of the fact that the trailer rides up on or exerts a pressure on the tractor through the draw bar between them, which quite independent of the tractor brake system applies the brakes on the trailer.

The manually controlled or driver controlled tractor trailer brake assembly requires a connection between the hydraulic braking system on the tractor and a hydraulic braking system on the trailer in such way that when the driver of the tractor applies the brakes, this automatically results in trailer brake application. Such connection also enables the driver to apply the trailer brakes independent of the application of the tractor brakes.

The surge brake relationship is a simple, compact and inexpensive one but because the pressure applying the trailer brakes always comes from behind the tractor, there is always the possibility of jackknifing of the tractor trailer combination. It is therefore under many circumstances quite desirable to be able to apply the brakes in unison on the tractor and trailer or even to apply the brakes on the trailer at the will of the operator independent of or before the tractor brake application.

Such selected control of the trailer brakes may be very important in an emergency situation when it is highly desirable to be able to apply the brakes very rapidly on the tractor.

A brake system controlled by the driver of the tractor for applying brakes on the tractor and the trailer requires some kind of severable connection between the tractor and trailer brake systems but the disconnection of the two systems does not normally occur in connection with braking of the tractor and trailer as a unit so such a severable connection may be present in the system and still give the operator under all ordinary conditions the power of controlling the trailer brakes independent of the surge effect.

One important factor in this situation is that even slight relative reduction of tractor speed with respect to trailer speed will inaugurate the surge effect and take up the slack in the hydraulic system even before the brakes are applied. When that occurs, then when the operator applies the brakes on the tractor, the slack having all been taken up on the trailer and in the connection between the tractor and trailer permits almost instantaneous mechanical brake application.

This invention is applicable to a wide range of tractor trailer combination and to a wide range of surge brake and manually applied braking relationship, some of the details being well illustrated in the two patents above referred to.

The invention is illustrated more or less diagrammatically in the accompanying drawings, wherein—

Figure 2:
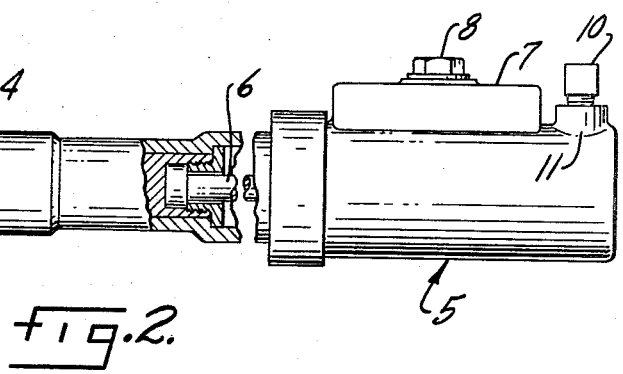
Figure 3:
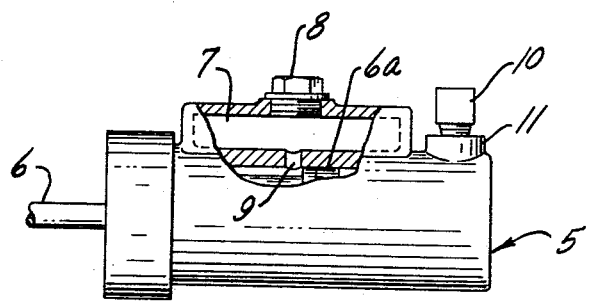

FIGURE 1 is a diagrammatic flow sheet of the brake equipment of a tractor trailer combination;
FIGURE 2 is a side elevation of a surge brake apparatus with parts in section;
FIGURE 3 is a side elevation of a master cylinder with parts in section;
FIGURE 4 is a vertical section through an actuating cylinder;
FIGURE 5 is a section along the line 5—5 of FIGURE 4.

Like parts are indicated by like numerals throughout the specification and drawings.

A wheeled tractor 1 is connected to the wheeled trailer 2 by a telescoping two piece draw bar, the tractor section 3 of the draw bar slides on the trailer section 4. A master cylinder 5 is permanently mounted on the trailer section of the draw bar. A master cylinder piston rod 6 is attached to the tractor section of the draw bar. Under ordinary circumstances with the draw bar in tension, the piston rod is extended. When the tractor is decelerated, the trailer rides up on it and forces the piston rod into the master cylinder to move the piston 6a inwardly to apply pressure on the cylinder. The cylinder has the usual hydraulic fluid reservoir 7. It may be filled through a filler cap 8 and communicates with the interior of the cylinder through the port 9 open when the piston is in the left hand position as in FIGURE 3 and closed as the piston rod moves the piston 6a to the right to apply pressure on the cylinder. The duct 10 leads from the discharge port 11 of the master cylinder to the intake port 12 of a dual purpose cylinder 13 on the trailer. Piston valve 14 in the dual purpose cylinder 13 is reduced in diameter intermediate its ends as at 15 to define an annular clearance space completely encircling the piston in communication with the intake port 12. Slot 16 in the piston is open to and communicates with reduced portion or annular space 15 and a port 17 at the inboard end of the piston communicating with the slot or recess 16 closed by a ball valve 18 unseated by contact with the stop pin 19 when the piston is moved to the right by the spring 20 so that there is a free passage through the piston from the intake 12 to the exhaust 21 whence a duct 22 leads to the hydraulic brake system on the trailer, the details of which are not illustrated since they are conventional.

Under these circumstances the dual purpose cylinder being open as indicated when the surge brake tries to apply surge pressure as a result of overrunning of the trailer pressure passes freely through the dual purpose cylinder and the brakes are applied on the trailer quite independent of the dual purpose cylinder.

A duct 23 leads from the tractor hydraulic brake system to a connection cylinder 24 in which is a piston 25 engaging a connecting rod 26 for the piston 14 so that when pressure is applied in the tractor hydraulic system, the piston 14 is moved to the left in FIGURE 4 to apply the brakes on the trailer without reference to pressure in the master cylinder 5 because movement of the piston 14 to the left moves the ball valve 18 out of contact with the pin 19 to enable the valve spring 27 to seat the valve to close the port leading to the interior of the piston, thus applying braking force to the trailer quite independent of the surge effect of the master cylinder.

The usual master cylinder on the tractor is illustrated diagrammatically at 30 and dual purpose cylinder 31 is diagrammatically illustrated in the duct 23. When the lever 34 is rotated, it applies pressure to move the piston 14 to the left to compress the spring 20 within the cylinder 13 just as is the case in the Stromberg Patent No. 2,704,585. This dual purpose cylinder acts in the same way as the dual purpose cylinder 13 and the operator may by any suitable lever such as the lever associated with the cylinder 19 in Stromberg Patent No. 2,704,585 apply trailer brakes without applying the tractor brakes or may apply both by applying pressure to the usual pistons in cylinders 30 and 31.

The lock up or the disconnecting relationship includes a latch lever 32, a latch 33 and a manually actuated lever 34 by which the piston rod 26 may be moved to the left upon breaking the connection or at the will of the operator to separate the tractor brake system from the trailer brake system just as indicated.

The invention is illustrated in such wise that the master cylinder is actuated by the surge brake apparatus and the dual actuating cylinder is operated responsive to the driver on the tractor. Obviously these two might equally well be reversed because in either case, the two cylinders are actuated by pressure means and the master cylinder works through the dual cylinder in either case.

This relationship between the surge applied brakes and the operator applied brakes is quite unique because if the surge system does not apply enough braking pressure, the operator may apply more braking pressure beyond that applied by the surge. On the other hand, if the operator does not apply enough braking pressure and the surge continues to run up on the tractor, the surge builds up additional pressure so that either way we are able to get the maximum pressure in the system.

I claim:

1. A tractor-trailer combination including a surge actuated master cylinder on the trailer, a dual purpose cylinder on the trailer, a piston valve in the dual purpose cylinder, a hydraulic brake system on the trailer, a hydraulic connection between the master cylinder and the hydraulic brake system, passing through the dual purpose cylinder and controlled by the piston valve, means for biasing the piston valve in open position to permit free hydraulic flow between the master cylinder and the brake system for surge brake application responsive to overrunning of the trailer on the tractor, a hydraulic brake system on the tractor, a separable power connection between the tractor brake system and the dual purpose cylinder to force the piston valve to closed position, to shut off the master cylinder and to apply pressure to the trailer brake system independent of the master cylinder.

2. The device of claim 1 characterized by the fact that means, independent of the tractor brake system, are provided to separate the power connection between the dual purpose cylinder and the tractor brake system and to force the piston valve into closed position, shutting off the master cylinder and applying brake pressure independent of the master cylinder to the trailer brake system.

References Cited

UNITED STATES PATENTS

| | | | |
|---|---|---|---|
| 2,260,637 | 10/1941 | Ovenhouse | 188—112 |
| 2,704,585 | 3/1955 | Stromberg | 188—112 |

MILTON BUCHLER, *Primary Examiner.*

B. S. MOWRY, T. W. BUCKMAN, *Assistant Examiners.*